United States Patent
Sohn (10) Patent No.: US 10,888,405 B2
(45) Date of Patent: Jan. 12, 2021

(54) SONIC VIBRATION TOOTHBRUSH

(71) Applicant: ONE STAR INTERNATIONAL CO., LTD., Incheon (KR)

(72) Inventor: Jae-Hoon Sohn, Incheon (KR)

(73) Assignee: One Star International Co., Ltd., Incheon (KR)

( * ) Notice: Subject to any disclaimer, the term of this patent is extended or adjusted under 35 U.S.C. 154(b) by 0 days.

(21) Appl. No.: 15/579,673

(22) PCT Filed: Nov. 23, 2016

(86) PCT No.: PCT/KR2016/013508
§ 371 (c)(1),
(2) Date: Dec. 5, 2017

(87) PCT Pub. No.: WO2018/079913
PCT Pub. Date: May 3, 2018

(65) Prior Publication Data
US 2019/0247172 A1    Aug. 15, 2019

(30) Foreign Application Priority Data
Oct. 26, 2016  (KR) .................. 10-2016-0140024

(51) Int. Cl.
*A61C 17/22*   (2006.01)
*A61C 17/20*   (2006.01)
(Continued)

(52) U.S. Cl.
CPC .............. *A61C 17/221* (2013.01); *A46B 3/20* (2013.01); *A46B 9/028* (2013.01); *A46B 13/003* (2013.01);
(Continued)

(58) Field of Classification Search
CPC ..... A46B 9/00; A46B 13/003; A46B 15/0002; A46B 7/00; A46B 3/22; A46B 9/04;
(Continued)

(56) References Cited

U.S. PATENT DOCUMENTS 2,273,278 A * 2/1942 Mackenzie-Kennedy ................. A46B 9/04
15/167.1
4,882,803 A  11/1989 Rodgers et al.
(Continued)

FOREIGN PATENT DOCUMENTS

CN  1043618 A   7/1990
CN  2785436 Y   6/2006
(Continued)

OTHER PUBLICATIONS

PCT, International Search Report for PCT/KR2016/013508 dated Aug. 18, 2017.
PCT, Written Opinion for PCT/KR2016/013508 dated Aug. 18, 2017.

*Primary Examiner* — Andrew A Horton
(74) *Attorney, Agent, or Firm* — Schott, P.C.

(57) ABSTRACT

A sonic vibration toothbrush includes a head extending in an axial direction with a plurality of bristles implanted at an outer circumference thereof in a direction perpendicular to the axial direction; a head arm having an inner space to transmit a sonic wave to the head. A top portion of the head arm where the inner space is narrowed is coupled to the head and a motor accommodating portion that accommodates a motor therein and transmits a sonic wave generated by a rotating force of the motor to the head arm. The toothbrush further includes a handle having a space for accommodating a battery; an input unit provided at the motor accommodating portion in a button form; a display unit provided at the
(Continued)

handle; and a control circuit that controls the motor according to input information provided from the input unit.

5 Claims, 7 Drawing Sheets

(51) Int. Cl.
    *A46B 3/20*           (2006.01)
    *A46B 9/02*           (2006.01)
    *A46B 15/00*         (2006.01)
    *A46B 13/00*         (2006.01)
    *A61C 17/16*         (2006.01)
    *A61C 17/26*         (2006.01)

(52) U.S. Cl.
    CPC .......... *A46B 15/0034* (2013.01); *A61C 17/16* (2013.01); *A61C 17/20* (2013.01); *A61C 17/222* (2013.01); *A61C 17/225* (2013.01); *A61C 17/26* (2013.01); *A46B 2200/1066* (2013.01)

(58) Field of Classification Search
    CPC ........... A46B 5/0095; A46B 5/00; A46B 1/00; A61C 17/221; A61C 17/34; A61C 17/225; A61C 17/20
    USPC ......................................................... 15/22.1
    See application file for complete search history.

(56) References Cited

U.S. PATENT DOCUMENTS

| | | | |
|---|---|---|---|
| 6,026,828 A * | 2/2000 | Altshuler | A46B 15/0002 |
| | | | 132/308 |
| 6,760,945 B2 | 7/2004 | Ferber et al. | |
| 9,498,053 B2 * | 11/2016 | Patel | A46B 15/0006 |
| 9,987,109 B2 * | 6/2018 | Sokol | A61C 17/0202 |
| 10,080,633 B2 * | 9/2018 | Meerbeek | A46B 15/0004 |
| 10,342,648 B2 * | 7/2019 | Bloch | A61C 17/221 |
| 2007/0163061 A1 | 7/2007 | Sorrentino | |
| 2009/0211041 A1 | 8/2009 | Bock | |
| 2011/0277256 A1 * | 11/2011 | Jo | A46B 15/0002 |
| | | | 15/106 |

FOREIGN PATENT DOCUMENTS

| | | | | |
|---|---|---|---|---|
| CN | 201085700 Y | 7/2008 | | |
| CN | 101959440 A | 1/2011 | | |
| CN | 102284141 A | 12/2011 | | |
| CN | 102429739 A | 5/2012 | | |
| CN | 203724258 U | 7/2014 | | |
| CN | 204863533 U | 12/2015 | | |
| KR | 100865731 B1 | 10/2008 | | |
| KR | 1020090065779 A | 6/2009 | | |
| KR | 200458868 | 6/2012 | | |
| KR | 200458868 Y1 | 6/2012 | | |
| KR | 101295950 | 8/2013 | | |
| KR | 2020130006243 | 10/2013 | | |
| KR | 101615438 | 4/2016 | | |
| WO | WO-2009113681 A1 * | 9/2009 | ............... | A46B 9/04 |
| WO | 2015087219 A1 | 6/2015 | | |

* cited by examiner

SONIC VIBRATION TOOTHBRUSH

RELATED APPLICATIONS

The present application is a national phase application under 35 USC 371 of PCT Application No. PCTKR2016013508 filed Nov. 23, 2016, which claims priority to Korean Patent Application No. 10-2016-0140024 filed on Oct. 26, 2016 in the Republic of Korea, the disclosures of which are incorporated herein by reference as if fully set forth herein.

TECHNICAL FIELD

The present disclosure relates to a sonic vibration toothbrush, and more particularly, to a sonic vibration toothbrush for cleaning teeth and oral cavity by vibrating bristles by means of sonic vibration.

BACKGROUND

Generally, a toothbrush is composed of a plastic handle and bristles. The general toothbrush as above is used to remove foreign matter and scale on the teeth by using the movement of a human wrist or arm.

In addition, an electric toothbrush which automatically moves bristles by an electric force to clean the teeth has been further developed.

However, the conventional electric toothbrush moves the bristles by the rotation of a motor and may damage teeth or gums when the rotating force is strong. In addition, since the conventional electric toothbrush rotates the bristles in one direction, there is a limit in properly cleaning the teeth.

Korean Unexamined Patent Publication No. 10-2008-0025764 and Korean Unexamined Utility Model Publication No. 20-2013-0006243 disclose related techniques.

SUMMARY OF THE INVENTION

Technical Problem

The present disclosure is directed to proposing a sonic vibration toothbrush, which may easily clean the teeth and be conveniently used by a user.

The present disclosure is also directed to proposing a sonic vibration toothbrush, which may prevent the teeth and gums of a user from being damaged by adjusting the vibration intensity according to a request of the user.

The present disclosure is also directed to proposing a shape of bristles which may efficiently clean the teeth.

The present disclosure is also directed to proposing a method for minimizing vibrations generated during the cleaning process.

The present disclosure is also directed to proposing a method for preventing a toothbrush head where bristles are implanted from being broken.

Technical Solution

In one aspect of the present disclosure, there is provided a sonic vibration toothbrush, comprising: a head extending in an axial direction and having a plurality of bristles implanted at an outer circumference thereof in a direction perpendicular to the axial direction; a head arm having an inner space to transmit a sonic wave to the head and having a truncated cone shape so that the inner space is gradually narrowed from a bottom to a top, wherein a top portion of the head arm where the inner space is narrowed is coupled to the head; a motor accommodating portion configured to accommodate a motor therein and transmit a sonic wave generated by a rotating force of the motor to the head arm; a handle formed in a streamlined shape and having a space for accommodating a battery; an input unit provided at the motor accommodating portion in a button form; a display unit provided at the handle and having at least two lamps; and a control circuit configured to control the motor according to input information provided from the input unit.

In an embodiment, the input unit may include a first input button located at a center thereof, and second to fifth input buttons located at upper, lower, left and right sides based on the first input button; when the first input button is operated, the sonic vibration toothbrush is turned on/off or the sonic vibration toothbrush may be shifted to a user setting mode in which a rotating speed of the motor is set; in the user setting mode, when the second input button located at the upper side of the first input button or the third input button located at the lower side of the first input button is operated, the rotating speed of the motor may be adjusted as much as a first unit rotating speed; and in the user setting mode, when the fourth input button located at the left side of the first input button or the fifth input button located at the right side of the first input button is operated, the rotating speed of the motor may be adjusted as much as a second unit rotating speed which is different from the first unit rotating speed.

In an embodiment, at least one input button among the second to fifth input buttons may include a piezoelectric sensor which gives different values depending on a magnitude of pressure, and the rotating speed of the motor is adjusted according to the magnitude of input pressure.

In an embodiment, the bristles implanted at the head may have lengths which are longer as being farther from the head arm and shorter as being closer to the head arm on the whole.

In an embodiment, when a difference between a current rotating speed of the motor and a rotating speed according to the input information is equal to or greater than a predetermined reference value, the control circuit may change the rotating speed of the motor to a predetermined rotating speed between the current rotating speed and the rotating speed of the input information, keep the predetermined rotating speed for a predetermined time, and then change the predetermined rotating speed to the rotating speed of the input information.

In an embodiment, the head may be made of a transparent material and be surface-coated so that light irradiated from the head arm is transmitted toward a terminal end of the head.

In an embodiment, the head may be partially inserted into the head arm and coupled to the head arm, a portion of the head inserted into the head arm may have a relatively greater diameter than a portion of the head not inserted into the head arm, and the portion of the head inserted into the head arm and the portion of the head not inserted into the head arm may be connected with a slope.

In an embodiment, the head may include a head body extending in the axial direction and a plurality of washer rings provided around the head body so that the head body is inserted into the plurality of washer rings, the plurality of washer rings may include at least one washer ring at which bristles are implanted and at least one washer ring at which no bristle is implanted, and the washer ring at which bristles are implanted and the washer ring at which no bristle is implanted may be alternately provided around the head body.

Advantageous Effects

The sonic vibration toothbrush according to the present disclosure vibrates the head having bristles implanted at an outer circumference thereof over 360 degrees in a direction perpendicular to an axial direction by generating sonic wave, and thus it is possible for a user to remove foreign matter or scale on the teeth or gums.

In addition, the sonic vibration toothbrush according to the present disclosure may prevent teeth or gums of the user from being damaged by adjusting the intensity of the sonic wave depending on toothbrushing targets such as molar, gums and front teeth of the user, and thus it is possible to provide an optimal toothbrushing solution depending on toothbrushing targets.

Moreover, in the present disclosure, the noise generated by the sonic vibration toothbrush is minimized by blocking a sudden change of a rotating speed of a motor, and also it is possible to prevent the toothbrush head from broken.

In addition, in the present disclosure, the bristles are provided to have an inverted trapezoidal shape to facilitate easier toothbrushing to the molar.

Further, it would be obviously understood from the following description by those skilled in the art that the embodiments according to the present disclosure can also solve various technical objects not mentioned above.

DESCRIPTION OF THE DRAWINGS

The foregoing and further features of the present disclosure will become more apparent through various embodiments described with reference to the accompanying drawings. Hereinafter, various embodiments of the present disclosure will be described in detail so as to be easily understood and reproduced by those skilled in the art.

Figure 1:
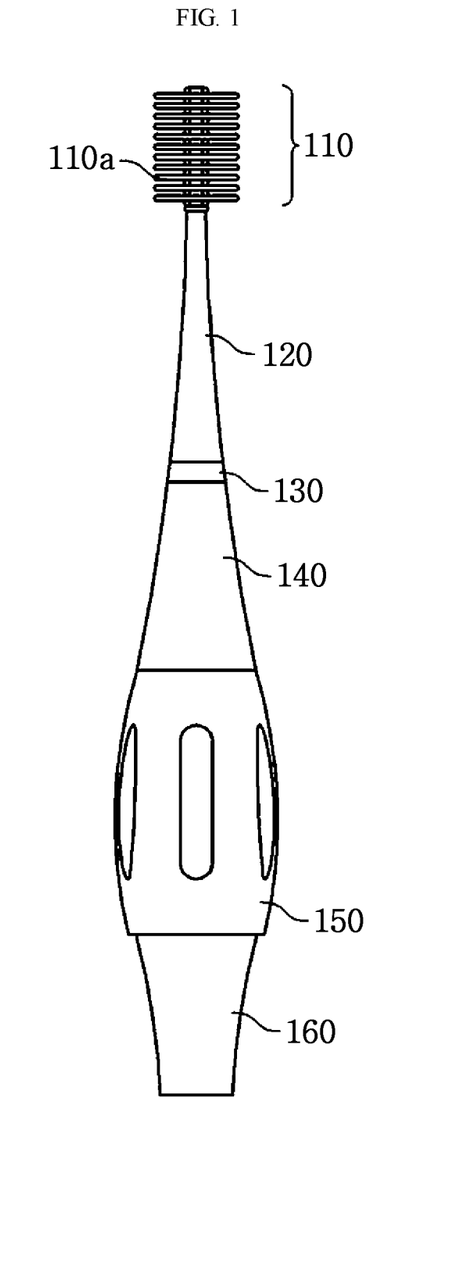
FIG. 1 is a diagram showing a sonic vibration toothbrush according to an embodiment of the present disclosure.
Figure 2:
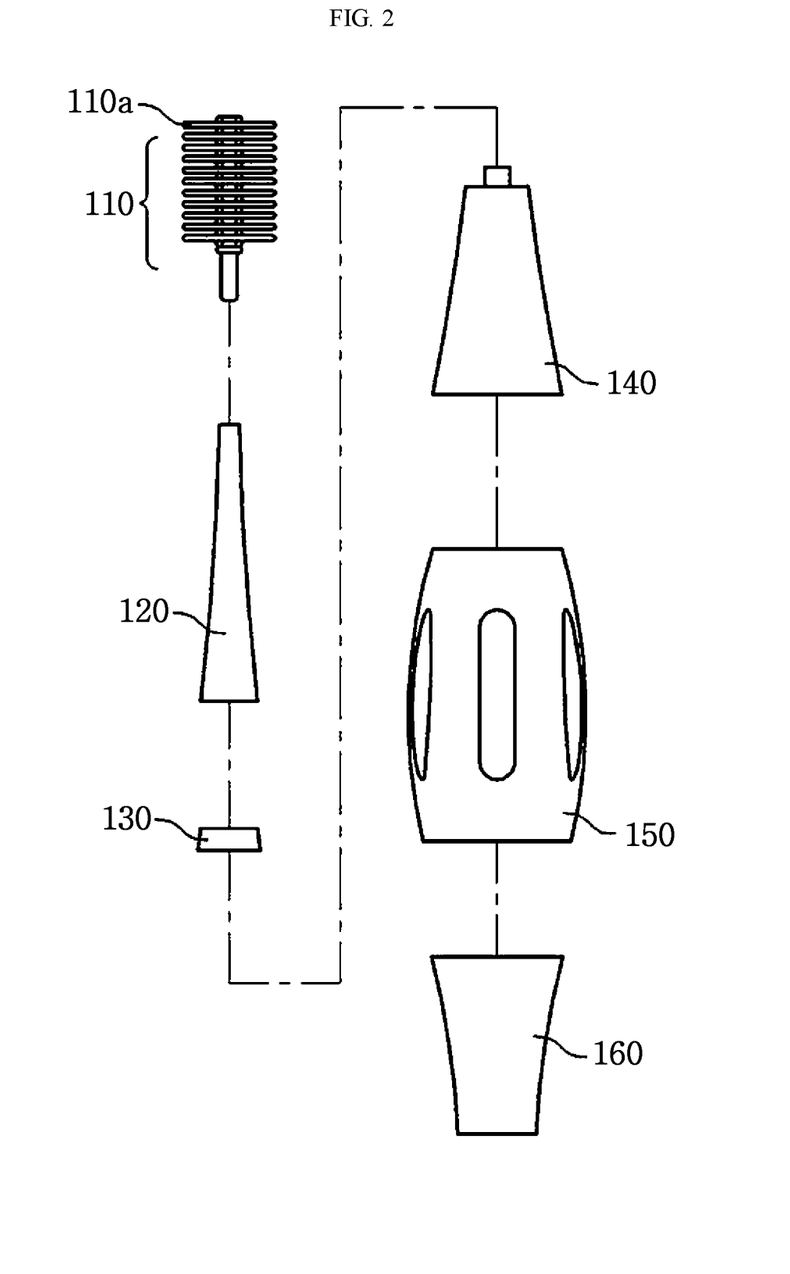
FIG. 2 is an exploded perspective view showing the sonic vibration toothbrush according to an embodiment of the present disclosure.

FIG. 1 is a diagram showing a sonic vibration toothbrush according to an embodiment of the present disclosure, and FIG. 2 is an exploded perspective view showing the sonic vibration toothbrush according to an embodiment of the present disclosure. Hereinafter, a sonic vibration toothbrush according to an embodiment of the present disclosure will be described in detail with reference to FIGS. 1 and 2.

Referring to FIGS. 1 and 2, a sonic vibration toothbrush includes a head, a head arm, a joint ring, a motor accommodating portion, a handle and a support. Other components may be further included in the sonic vibration toothbrush of the present disclosure in addition to the above.

The head 110 is used for cleaning the teeth or gums and extends in an axial direction. Also, a plurality of bristles may be implanted at an outer circumference of the head 110 in a direction perpendicular to the axis. In other words, the bristles may be implanted at the entire outer circumference of the head 110 over 360 degrees about the axis in a direction perpendicular to the axis.

The head 110 may be made of a transparent PET material, and the head 110 may be surface-coated so that light irradiated from the head arm 120, explained later, is transmitted toward a terminal end of the head 110. If the head 110 is surface-coated, the light irradiated from the head arm 120 is transmitted toward the terminal end of the head 110. If the light is irradiated toward the terminal end of the head 110, a third party may check an oral condition of the user. In other words, in the present disclosure, the head 110 is surface-coated so that the light is transmitted only toward the terminal end of the head 110.

The bristles 110a may have the same diameter and be welded to the outer circumference of the head 110 by means of ultrasonic wave to be implanted at the outer circumference of the head 110. The head 110 may be detachably coupled to the top of the head arm 120. In other words, when the bristles 110a are worn or warped, the existing head is separated from the head arm and a new head is coupled to the top of the head arm, resulting in replacement of the bristles of the sonic vibration toothbrush.

The head arm 120 is coupled to the head 110 and the motor accommodating portion 140 and has an inner space for transmitting a sonic wave generated by a vibration element to the head 110. The head arm 120 may have a truncated cone shape so that the inner space is gradually narrowed from a bottom to a top. In addition, a top portion of the head arm 120 where the inner space is narrowed is coupled to the head 110, and a bottom portion of the head arm 120 is coupled to the motor accommodating portion 140 through the joint ring 130. The sonic wave generated by the vibration of the vibration element is amplified through the head arm 120 having a truncated cone shape and transmitted to the head 110. In other words, the sonic wave generated by the vibrating element passes through the inner space of the head arm 120, which is gradually narrowed in an upper direction, to amplify the sound pressure, and the amplified sonic wave is transmitted to the head 110.

The head arm 120 and the head 110 may be integrally formed, or may be manufactured in a detachable structure. The head arm 120 may be made of transparent plastic so that the light emitted from a display unit, explained later, may be discharged to the outside.

Hereinafter, the coupling structure of the head arm 120 and the head 110 will be described in detail.

Figure 3:
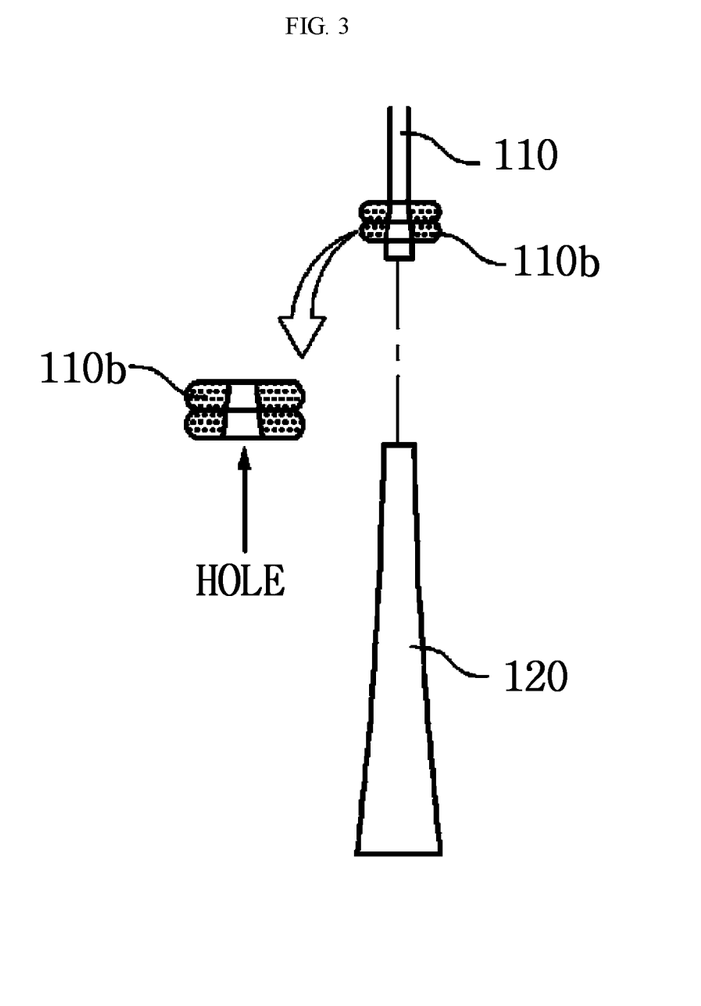
FIGS. 3 and 3A show a diagram showing a coupling structure of a head arm and a head of the sonic vibration toothbrush according to an embodiment of the present disclosure.

FIG. 3 is a diagram showing a coupling structure of a head arm and a head of the sonic vibration toothbrush according to an embodiment of the present disclosure. Hereinafter, the coupling structure of the head arm and the head of the sonic vibration toothbrush according to an embodiment of the present disclosure will be described in detail with reference to FIG. 3.

Generally, if the head is formed with the same diameter, when the sonic vibration toothbrush is used, a portion where the head and the head arm are coupled receives a relatively large force in comparison to the other portion, and thus the corresponding portion may be broken. The present disclosure suggests a solution to this problem.

Figure 3A:
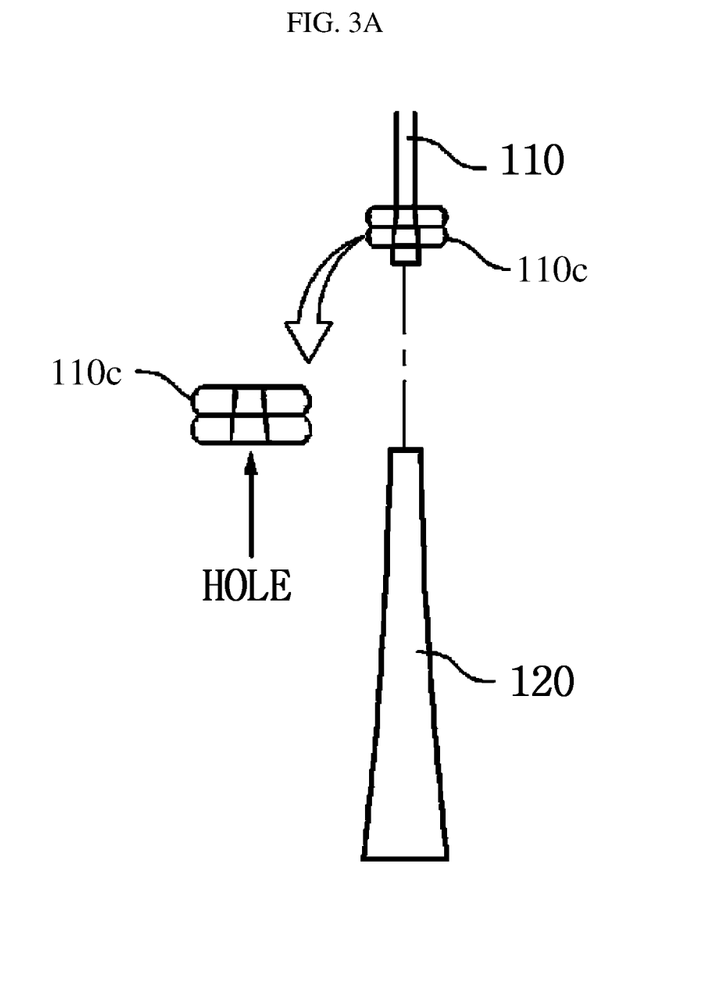

As shown in FIGS. 3 and 3A, the head 110 may include a head body extending in the axial direction and a plurality of washer rings 110b provided around the head body so that the head body is inserted into the washer rings 110b. In this case, the plurality of washer rings 110b may include at least one washer ring at which bristles are implanted and at least one washer ring at which no bristle is implanted (the washer ring with no bristles 110c can be seen in FIG. 3A). The washer ring with at which bristles are implanted and the washer ring at which no bristle is implanted may be alternately provided around the head body. In other words, the bristles are implanted directly at the outer surface of the head body, or as shown in FIG. 3, the bristles may be implanted at the washer ring 110b provided around the head body.

The body of the head 110 may have different diameters, rather than having the same diameter as a whole. In other words, the body of the head 110 is partially inserted into the head arm 120 and coupled to the head arm 120, and the portion of the head 110 inserted into the head arm 120 has a relatively larger diameter than the portion of the head 110 not inserted into the head arm 120. Also, the portion of the head 110 inserted into the head arm 120 and the portion of the head 110 not inserted into the head arm 120 may be connected with a slope. As described above, since the diameter of the portion of the head 110 inserted into the head arm 120 is greater than the diameter of the other portion of the head 110, it is possible to prevent the corresponding portion from being broken.

Meanwhile, a hole is formed at the center of the washer ring 110b inserted into the body of the head 110. In this case, the hole of the washer ring 110b inserted into the inclined body portion of the head 110 may have an inclined shape that conforms to the shape of the corresponding portion. In addition, if at least two washer rings 110b are inserted into the inclined body portion of the head 110, the holes respectively formed in the washer rings 110b have different shapes according to the positions to be inserted into the body of the head 110. In other words, the hole of the washer ring inserted into a head portion having a relatively large diameter has a relatively larger diameter than the hole of the washer ring inserted into a head portion having a relatively small diameter.

As described above, in the present disclosure, the washer ring at which bristles are implanted and the washer ring at which no bristle is implanted are alternately provided around the head, and the washer ring inserted into an inclined portion of the head may also have a hole with an inclined shape.

The motor accommodating portion 140 accommodates a motor therein and may transmit a sonic wave generated by the rotating force of the motor to the head arm 120. In this case, an upper portion of the motor accommodating portion 140 is coupled to a lower portion of the head arm 120 by means of the joint ring 130, and a lower portion thereof is coupled to the handle 150. A protruding member may be formed at the upper portion of the motor accommodating portion 140 to easily transmit the sonic wave to the head arm 120. Projections are formed at regular intervals on the outer circumference of the protruding member, and the projections are in contact with the inside of the lower end of the head arm 120 to increase the coupling force between the motor accommodating portion 140 and the head arm 120, thereby preventing the motor accommodating portion 140 and the head arm 120 from being separated due to an impact. The motor accommodating portion 140 may be made of transparent plastic and discharge light emitted from the display unit, explained below, to the outside.

The motor accommodating portion 140 accommodates the motor therein, and a control circuit may also be selectively accommodated therein. In addition, a light source for irradiating light toward a terminal end of the head 110 through the head arm 120 may be accommodated in the motor accommodating portion 140. In another embodiment, the control circuit may also be accommodated in the handle 150.

The motor may give a rotating force in a specific direction and be operated by turning on/off a switch. The motor includes a vibrating element, and when the motor gives a rotating force, the vibrating element generates a vibrating sonic wave.

In addition, the motor controls a rotating speed according to an operation mode of the toothbrush, and the vibrating element generates sonic waves with different frequencies according to the operation mode of the toothbrush. The sonic wave has a frequency within a range generated by the vibration of the vibrating element, and the sonic wave is transmitted to the head 110 through the head arm 120 to vibrate the bristles of the head 110.

The control circuit is a means for determining whether or not to operate the motor, determining a rotating speed and controlling the output of the display unit and is electrically connected to the motor, the input unit and the display unit. If a drive switch is turned on, the control circuit operates the motor to give a rotating force. The control circuit checks an operating state of the sonic vibration toothbrush and controls the rotating speed of the motor based on the checked result.

The handle 150 has a streamlined shape and may have a space for accommodating the battery. An upper portion of the handle 150 is coupled to the motor accommodating portion 140, and a lower portion thereof is coupled to the support 160. A waterproof ring is interposed between the handle 150 and the support 160 to prevent water from entering. The handle 150 has a space for accommodating the battery therein. As another embodiment, the control circuit may be included in the handle 150. The battery accommodated in the handle 150 provides power to the motor, the control circuit and the display unit. The battery may be a general dry cell or a rechargeable lithium ion battery.

In addition, a silicon cover may be formed on the outer surface of the handle 150 to prevent slipping when a user performs toothbrushing using the sonic vibration toothbrush according to the present disclosure. Further, since the handle 150 has a streamlined shape, it is possible to improve stability and comfort when the user performs toothbrushing while gripping the sonic vibration toothbrush.

The handle 150 and the motor accommodating portion 140 may be provided in an integrated form.

The handle 150 may have a battery charging terminal.

A display unit may be provided at the surface of the handle 150. The display unit may be configured using a lamp or the like. For example, the display unit may include at least two lamps, each of which may indicate the state of the sonic vibration toothbrush. In the present disclosure, if the display unit has a single lamp, a current state of the sonic vibration toothbrush may be exhibited using the color of the lamp. For example, if the color of the lamp is blue, it may indicate that the operation mode of the sonic vibration toothbrush is an oral cleaning mode, and if the color of the lamp is red, it may indicate that the lamp is being charged. Also, if the color of the lamp is green, it may indicate that the charging is completed. In addition, it is possible to indicate that the operation mode of the sonic vibration toothbrush is a gum massaging mode by using the color of the lamp. In this way, in the present disclosure, it is possible to indicate the current state of the sonic vibration toothbrush using a lamp.

Figure 4:
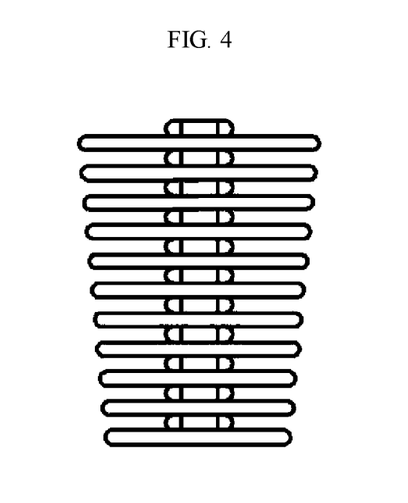
FIG. 4 is a diagram showing a shape of bristles implanted at the head of the sonic vibration toothbrush according to an embodiment of the present disclosure.

FIG. 4 is a diagram showing a shape of bristles implanted at the head of the sonic vibration toothbrush according to an embodiment of the present disclosure. Hereinafter, the shape of the bristles implanted at the head of the sonic vibration toothbrush according to an embodiment of the present disclosure will be described in detail with reference to FIG. 4.

Seeing FIG. 4, the plurality of bristles 110a implanted at the head 110 may have different lengths. As described above, the bristles 110a may be implanted directly at the outer circumference of the head 110 or may be implanted at the washer ring 110b that is inserted into the head 110. The bristles implanted at the head 110 as described above may have lengths which are longer as being farther from the head arm 120 and shorter as being closer to the head arm 120. In other words, as shown in FIG. 4, the length of the bristles located at a relatively upper portion may be relatively longer than the length of the bristles located at a relatively lower portion. In other words, the bristles implanted at the head may have a reverse trapezoidal shape on the whole based on a vertical section.

If the bristles implanted at the head have the same length, when the user cleans the molar among the teeth, all the bristles implanted at the head do not contact the surface of the molar equally, but only some bristles located at the bottom of the head contact the molar surface. This is because when the molar is being cleaned, the head enters the mouth of the user not in parallel to the molar surface but with a slope so that the top of the head is oriented upwards. Thus, only some bristles are used for cleaning, and thus the cleaning efficiency is reduced. In particular, only some bristles located at the bottom are worn or warped faster.

In the present disclosure, in order to solve the above problem, the bristles implanted at the head surface or the washer ring may have different lengths depending on a position on the head, rather than having the same length. In particular, in the present disclosure, the length of the bristles located at a relatively upper portion of the head may be relatively longer than the length of the bristles located at a relatively lower portion of the head, so that the bristles implanted at the head may have a reverse trapezoidal shape on the whole based on a vertical section.

Figure 5:
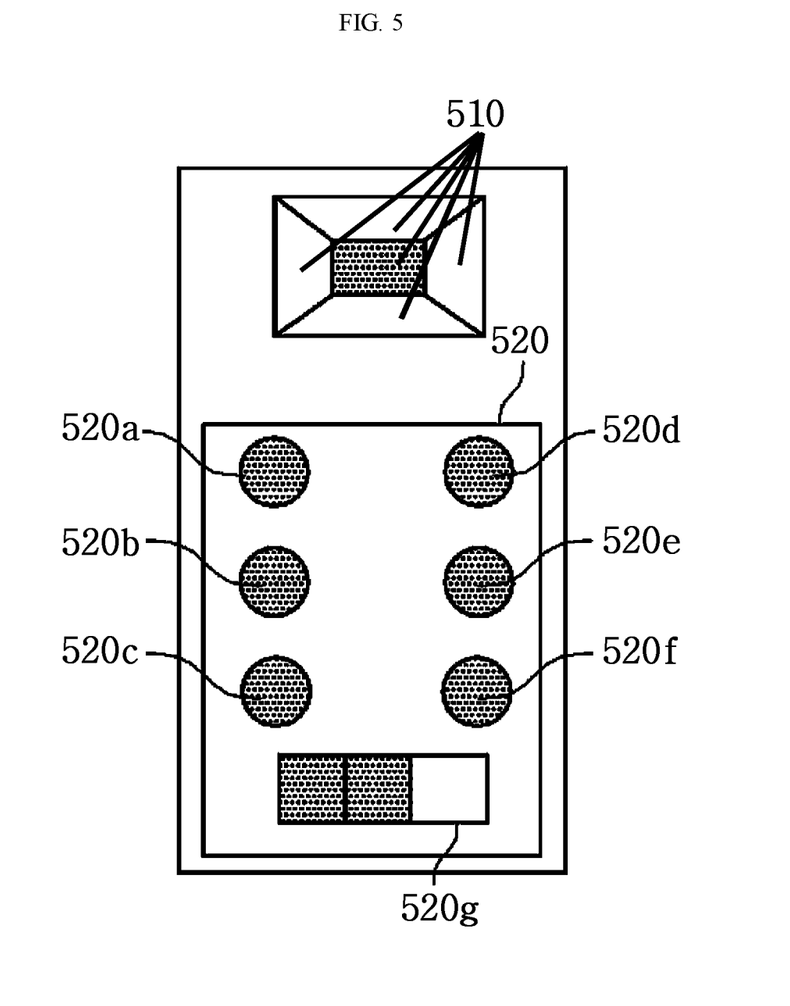
FIG. 5 is a diagram showing an input unit and a display unit of the sonic vibration toothbrush according to an embodiment of the present disclosure.

FIG. 5 is a diagram showing an input unit and a display unit of the sonic vibration toothbrush according to an embodiment of the present disclosure. Hereinafter, the shapes of the input unit and the display unit of the sonic vibration toothbrush according to an embodiment of the present disclosure will be described in detail with reference to FIG. 5.

In FIG. 5, the input unit 510 may be provided in the motor accommodating portion 140 of the sonic vibration toothbrush and may be configured in a button form. The display unit 520 may be provided at the handle 150 of the sonic vibration toothbrush and may include a lamp such as an LED. Other components may be further included in the display unit and the input unit of the sonic vibration toothbrush proposed in the present disclosure, in addition to the above.

For example, the input unit 510 may include five buttons. In other words, the input unit 510 may include a first input button located at the center thereof and second to fifth input buttons located at upper, lower, left and right sides of the first input button. In this case, the second input button located at the upper side of the first input button and the third input button located at the lower side of the first input button may serve as switches for controlling the rotating speed of the motor. For example, the second input button located at the upper side may be a switch for increasing the rotating speed of the motor, and the third input button located at the lower side may be a switch for reducing the rotating speed of the motor. In this case, the second input button and the third input button may adjust the rotating speed of the motor as much as a first unit rotating speed according to the manipulation of the user.

In addition, the fourth input button located at the left side of the first input button and the fifth input button located at the right side of the first input button may be switches for adjusting the rotating speed of the motor as much as a second unit rotating speed, which is different from the first unit rotating speed. In this case, at least one input button among the second to fifth input buttons may include a piezoelectric sensor for providing different values depending on the magnitude of the pressure and adjust the rotating speed of the motor according to the magnitude of the input pressure. For example, the fourth and fifth input buttons located at the left and right sides of the first input button may include a piezoelectric sensor and adjust the rotating speed of the motor according to the applied pressure. The user may adjust the rotating speed of the motor by using the second and third input buttons located at the upper and lower side and the fourth and fifth input buttons located at the left and right side and including a piezoelectric sensor. For example, the user may adjust the rotating speed of the motor roughly by using the fourth and fifth input buttons located at the left and right sides and then adjust the rotating speed of the motor minutely by using the second and third input buttons located at the upper and lower sides. In other words, if the fourth and fifth input buttons with a piezoelectric sensor adjust the rotating speed of the motor as much as ten (10), the second and third input buttons may adjust the rotating speed of the motor as much as 1 (1). Thus, the user may roughly adjust the rotating speed of the motor by using the fourth and fifth input buttons with the piezoelectric sensor and then minutely adjust the rotating speed of the motor by using the second and third input buttons.

The first input button located at the center serve as a switch for turning on/off or changing a mode. In other words, if the first input button is manipulated, the sonic vibration toothbrush may turn on/off or shifts the operation mode to a user setting mode for setting the rotating speed of the motor. For example, if the user manipulates the first input button repeatedly, the sonic vibration toothbrush may be powered on, shift to a first mode in which the motor rotates at a first rotating speed, shift to a second mode in which the motor rotates at a second rotating speed, and shift to a third mode in which the rotating speed of the motor varies, shift to a fourth mode in which the user sets the rotating speed of the motor, and be powered off in order.

For example, the first mode may be referred to as a normal mode, the second mode as a super mode, the third mode as a massage mode, and the fourth mode as a user setting mode.

In the user setting mode, the user may set the rotating speed of the motor by manipulating the second to fifth input buttons located on the top, bottom, left and right sides of the first input button. If the rotating speed of the motor is set by the user in the user setting mode, the sonic vibration toothbrush may operate the motor in the power-on mode to give a rotating force at the rotating speed set by the user. As described above, the user may set the rotating speed of the motor as desired in the user setting mode by using the second to fifth input buttons.

The display unit 520 may include a plurality of lamps, namely lamps 520a to 520c for displaying the first to third modes, lamps 520d and 520e for indicating whether the second and third input buttons are manipulated, a lamp 520f for indicating whether the fourth and fifth input buttons with a piezoelectric sensor are manipulated, a lamp 520g for indicating a state of charge, and the like. Other lamps may be further included in the display unit 520 proposed in the present disclosure, in addition to the above.

According to the embodiment of the present disclosure, the rotating speed of the motor may be adjusted in various ways. As described above, in the present disclosure, an input button including a piezoelectric sensor may be used, and the user may adjust the rotating speed of the motor by using a single input button including the piezoelectric sensor. For example, the sonic vibration toothbrush according to an embodiment of the present disclosure may be configured so that stepwise rotating speeds of the motor corresponding to stepwise pressure values applied to the piezoelectric sensor are stored, and the motor is operated to give a rotating speed corresponding to a pressure value actually applied to the piezoelectric sensor.

In addition, the sonic vibration toothbrush may also be configured so that, if the user who needs to adjust the rotating speed of the motor during the use of the sonic vibration toothbrush presses the input button with the piezoelectric sensor over a preset pressure value or over a predetermined pressing time, the sonic vibration toothbrush enters a motor rotating speed adjusting mode. In this case, if the user presses again the input button with the piezoelectric sensor, the sonic vibration toothbrush may calculate a value corresponding to the difference between a preset maximum pressure and the re-applied pressure and operate the motor to give a rotating force at the rotating speed corresponding to the calculated value. For example, the sonic vibration toothbrush may increase the rotating speed of the motor if the calculated value is small, and decrease the rotating speed of the motor if the calculated value is large. In other words, the user may press the piezoelectric sensor relatively strongly to increase the rotating speed of the motor or press the piezoelectric sensor relatively weakly to decrease the rotating speed of the motor. By doing so, the user may adjust the rotating speed of the motor in real time by using a single input button including a piezoelectric sensor.

In addition, in the present disclosure, it is possible to store a specific pressure value, gradually decrease the rotating speed of the motor if the piezoelectric sensor is pressed to a pressure that is relatively smaller than the stored pressure value, and gradually increase the rotating speed of the motor if the piezoelectric sensor is pressed at a relatively larger pressure than the stored pressure value.

Figure 6:
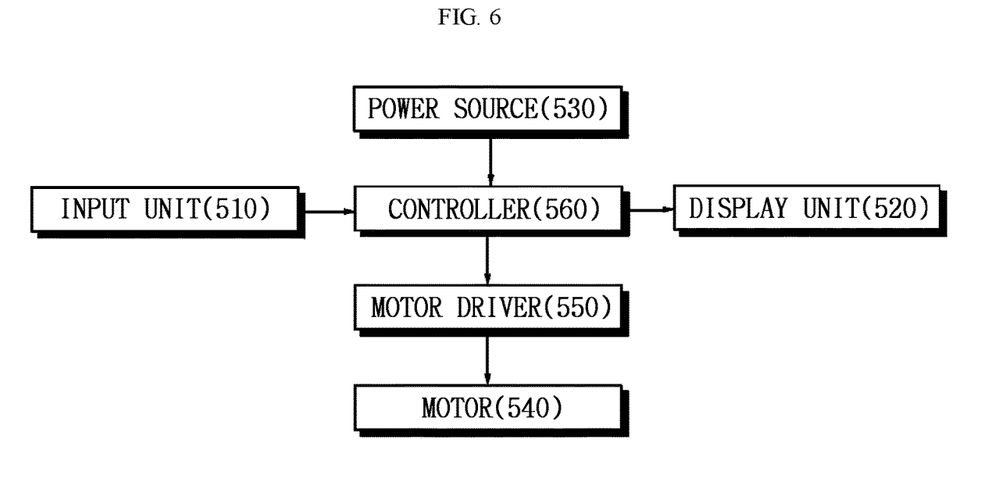
FIG. 6 is a block diagram showing the sonic vibration toothbrush according to an embodiment of the present disclosure.

FIG. 6 is a block diagram showing the sonic vibration toothbrush according to an embodiment of the present disclosure. Hereinafter, the sonic vibration toothbrush according to an embodiment of the present disclosure will be described in detail with reference to FIG. 6.

The sonic vibration toothbrush according to an embodiment of the present disclosure may include an input unit 510, a display unit 520, a power source 530, a motor 540, a motor driver 550 and a controller 560. Other components may be further included in the sonic vibration toothbrush proposed in the present disclosure, in addition to the above.

The input unit 510 and the display unit 520 are substantially identical to those of FIG. 5 and thus will not be described in detail here. The power source 530 supplies power to each component of the sonic vibration toothbrush. For example, the power source 530 includes a battery, and the power required for each component of the sonic vibration toothbrush may be supplied using the power charged in the battery.

The motor 540 is rotatable in a specific direction and may operate by turning on/off a switch. The motor 540 includes a vibrating element, and if the motor 540 gives a rotating force, the vibrating element generates a vibrating sonic wave. The motor 540 changes the rotating speed according to an operation mode of the toothbrush, and the vibrating element may generate sonic waves with different frequencies according to the operation mode of the toothbrush.

The motor driver 550 may control the rotating speed of the motor 540 according to a control command of the controller 560.

The controller 560 may control the operation of each component of the sonic vibration toothbrush. In other words, the controller 560 may control the rotating speed of the motor 540 or the like according to input information provided from the input unit 510.

In addition, the sonic vibration toothbrush according to the present disclosure may perform a variety of additional functions.

If the rotating speed of the motor changes suddenly to accelerate the motor, unnecessary vibration is generated in the sonic vibration toothbrush. In the present disclosure, a method for reducing the vibration generated when using the sonic vibration toothbrush is proposed. In other words, in the present disclosure, the rotating speed of the motor may be changed as much as an amount not greater than a predetermined set value by a single manipulation. For this purpose, if a difference between a current rotating speed of the motor and the rotating speed according to the input information provided from the input unit 510 is greater than a predetermined reference value, the controller 560 may change the rotating speed of the motor to a predetermined rotating speed between the current rotating speed and the rotating speed of the input information, keeps the predetermined rotating speed for a predetermined time, and then changes the predetermined rotating speed to the rotating speed of the input information. In this way, the vibration generated by the sonic vibration toothbrush may be reduced by limiting the variation of the rotating speed of the motor below a predetermined set value.

In addition, a rotating speed of the motor, which is proved as causing less oscillation and vibration through a pre-test, may be registered in advance in the sonic vibration toothbrush as a user-settable value, and in this way, the vibration generated in the sonic vibration toothbrush may be reduced.

Moreover, the present disclosure proposes a way for preventing the motor from overheating. The sonic vibration toothbrush (particularly, the motor driver) may include a temperature sensor to check the temperature of the motor and be configured to automatically shut off the power supply when the motor overheats.

The present disclosure has been described with reference to the embodiments depicted in the drawings, but they are just given by way of illustration only, and it would be understood by those skilled in the art that various changes and modifications within the scope of the disclosure can be made within the scope identical or equivalent to the appended claims.

What is claimed is:

1. A sonic vibration toothbrush, that uses vibration by a sonic wave, comprising:

a head extending in an axial direction and having a plurality of bristles implanted at an outer circumference thereof in a direction perpendicular to the axial direction;

a head arm having an inner space to transmit the sonic wave to the head and having a truncated cone shape so that the inner space is narrowed from a bottom to a top, wherein a top portion of the head arm where the inner space is narrowed is coupled to the head;

an accommodating portion having a motor therein and coupled to the bottom of the head arm to transmit a sonic wave generated by a rotating force of the motor to the head arm;

a handle formed in a streamlined shape and having a space for accommodating a battery;

an input unit provided at the accommodating portion in a button form;

a display unit provided at the handle and having at least two lamps; and a control circuit configured to control the motor according to input information provided from the input unit, wherein the head includes a head body extending in the axial direction and a plurality of washer rings provided around the head body and head body is inserted into the plurality of washer rings, wherein the head is partially inserted into the head arm and coupled to the head arm, a portion of the head inserted into the head arm has a greater diameter than a portion of the head not inserted into the head arm, and the portion of the head inserted into the head arm and the portion of the head not inserted into the head arm are connected with a slope, wherein the plurality of washer rings include at least one washer ring at which the plurality of bristles are implanted and at least one washer ring at which no bristle is implanted, wherein the input unit includes a first input button, and second and third input buttons located at upper and lower sides based on the first input button, wherein the input unit includes fourth and fifth input buttons located at left and right sides based on the first input button, wherein in the user setting mode, when the fourth input button located at the left side of the first input button or the fifth input button located at the right side of the first input button is operated, the rotating speed of the motor is increased or decreased as much as a second unit rotating speed which is different from the first unit rotating speed, wherein when the first input button is operated, the sonic vibration toothbrush is powered on so that the motor rotates at a predetermined rotating speed, or an operation mode of the sonic vibration toothbrush is shifted to a user setting mode in which a rotating speed of the motor is set, or the sonic vibration toothbrush is powered off, wherein in the user setting mode, when the second input button located at the upper side of the first input button is operated, the rotating speed of the motor is increased as much as a first unit rotating speed and set to an increased rotating speed, and when the third input button located at the lower side of the first input button is operated, the rotating speed of the motor is decreased as much as the first unit rotating speed and set to a decreased rotating speed, wherein, when the sonic vibration toothbrush is powered on and after the rotating speed of the motor is set in the user setting mode, the motor rotates at the set rotating speed, and wherein the bristles implanted at the head have lengths which are longer as being farther from the head arm and shorter as being closer to the head arm.

2. The sonic vibration toothbrush according to claim 1,
wherein at least one input button among the second to fifth input buttons includes a piezoelectric sensor which gives different values depending on a magnitude of pressure, and the rotating speed of the motor is adjusted according to the magnitude of input pressure.

3. The sonic vibration toothbrush according to claim 1,
wherein when a difference between a current rotating speed of the motor and a rotating speed according to the input information is equal to or greater than a predetermined reference value, the control circuit changes the rotating speed of the motor to a predetermined rotating speed between the current rotating speed and the rotating speed of the input information, keeps the predetermined rotating speed for a predetermined time, and then changes the predetermined rotating speed to the rotating speed of the input information.

4. The sonic vibration toothbrush according to claim 1,
wherein the head is made of a transparent material and is surface-coated so that light irradiated from the head arm is transmitted toward a terminal end of the head.

5. The sonic vibration toothbrush according to claim 1,
wherein the at least one washer ring at which the plurality of bristles are implanted and the at least one washer ring at which no bristle is implanted are alternately provided around the head body.

* * * * *